United States Patent
Bentele

(10) Patent No.: US 7,285,750 B2
(45) Date of Patent: Oct. 23, 2007

(54) PRESSURE-PUNCH DEVICE FOR FILM WELDING

(75) Inventor: Josef Bentele, Lärchenweg 8, D-88471 Laupheim (DE)

(73) Assignee: Josef Bentele, Laupheim (DE)

( * ) Notice: Subject to any disclaimer, the term of this patent is extended or adjusted under 35 U.S.C. 154(b) by 154 days.

(21) Appl. No.: 10/538,247

(22) PCT Filed: Feb. 12, 2004

(86) PCT No.: PCT/DE2004/000252

§ 371 (c)(1),
(2), (4) Date: Jun. 7, 2005

(87) PCT Pub. No.: WO2004/073960

PCT Pub. Date: Sep. 2, 2004

(65) Prior Publication Data

US 2006/0081609 A1    Apr. 20, 2006

(30) Foreign Application Priority Data

Feb. 18, 2003 (DE) .............................. 103 06 628

(51) Int. Cl.
*H05B 3/30* (2006.01)
*B29C 65/02* (2006.01)
*B29C 65/18* (2006.01)

(52) U.S. Cl. ............... 219/385; 219/243; 219/254; 219/259; 219/544; 264/319; 264/320; 156/583.1; 53/375.9

(58) Field of Classification Search ............ None
See application file for complete search history.

(56) References Cited

U.S. PATENT DOCUMENTS

| 2,574,095 | A | * | 11/1951 | Langer ............... 156/583.2 |
| 3,015,601 | A | * | 1/1962 | Fener ............... 156/583.2 |
| 3,085,144 | A | * | 4/1963 | Bate ............... 219/243 |
| 3,916,148 | A | * | 10/1975 | LaFleur ............... 219/243 |
| 4,353,855 | A |   | 10/1982 | Garabedian |
| 4,612,081 | A | * | 9/1986 | Kasper et al. ........ 156/583.1 |
| 2005/0082698 | A1 | * | 4/2005 | Gutman et al. ........ 264/319 |

FOREIGN PATENT DOCUMENTS

| DE | 1 956 717 | 5/1971 |
| GB | 2 033 831 | 5/1980 |
| GB | 2 289 237 | 11/1995 |
| WO | WO 02/37897 | 5/2002 |

* cited by examiner

*Primary Examiner*—J. Pelham
(74) *Attorney, Agent, or Firm*—Laurence A. Greenberg; Werner H. Stemer; Ralph E. Locher

(57) ABSTRACT

In a pressure stamp device for the sealing of films with a slidable stamp element with a stamping surface for applying pressure to a first foil to bond it to a supported second foil, a substantially homogeneous internal temperature distribution is reached by contributing the stamping element with multiple layers so that it includes basically three layers with a heated central layer of a first material with a thermal conductivity and two peripheral layers of a second material flanking it, the surface being formed by one of the peripheral layers to constitute the stamping surface.

14 Claims, 2 Drawing Sheets

PRESSURE-PUNCH DEVICE FOR FILM WELDING

CROSS REFERENCE TO RELATED APPLICATIONS

Figure 1:
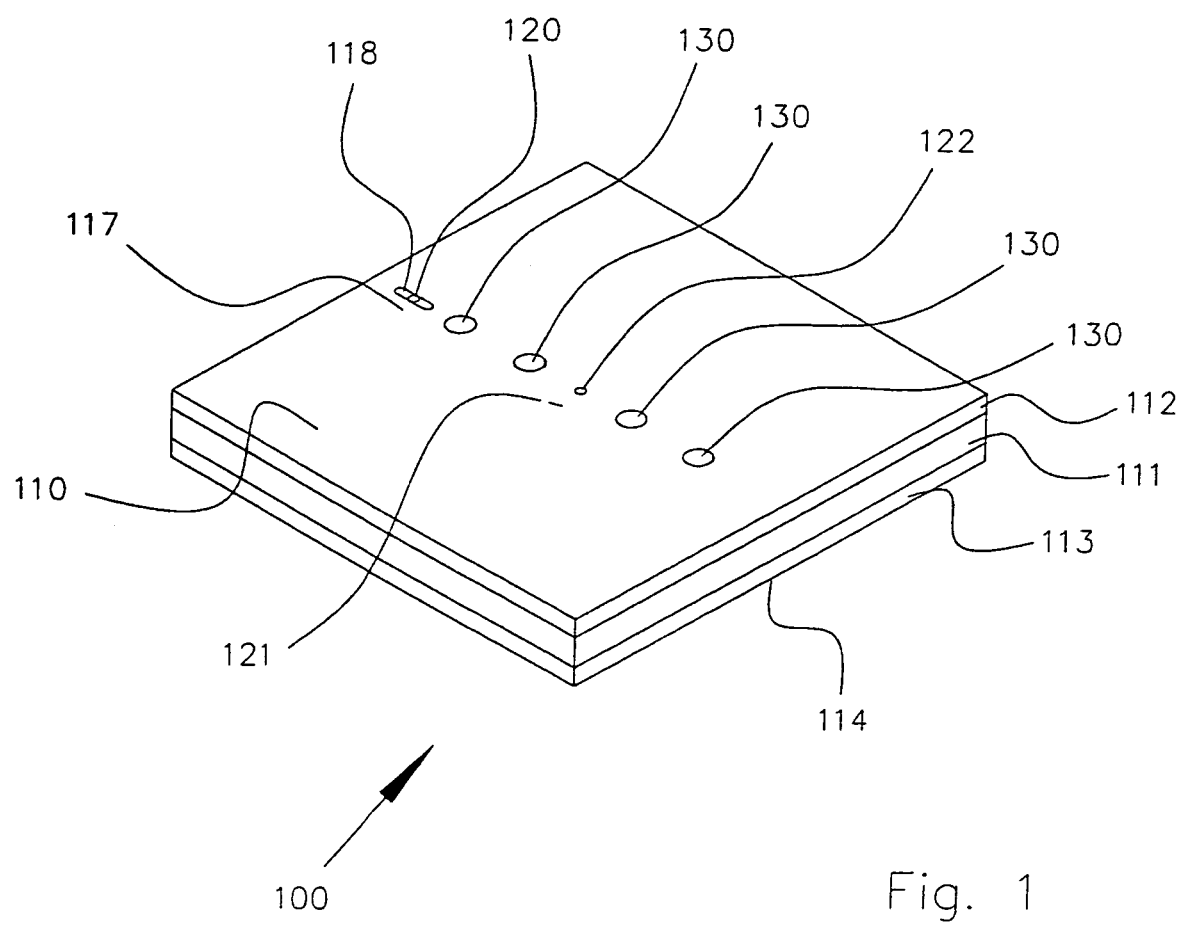

This application is the US national phase of PCT application PCT/DE2004/000252 filed 12 Feb. 2004 with a claim to the priority of German patent application 10306628.4 itself filed 18 Feb. 2003.

The invention relates to a pressure stamp device for the sealing [welding] of film with a heatable stamp element with a stamp surface for exerting a pressure upon a first foil [film] to bond it with a second foil [film] supported thereagainst.

Pressure stamp devices of the type described at the outset are used in the state of the art in order to produce a permanent connection between two films. The known devices have, however, the disadvantage that a uniformly distributed uniform pressing of one foil by a stamping element is not possible. This is because of the following:

Conventional pressing stamp devices are, as a rule, heated directly by heating elements received in bores and are made primarily from steel or another hard metal. Indirect heating has a nonhomogeneous temperature distribution within the press stamp with the consequence that in the vicinity of a heating element, the pressing stamp has a higher temperature than in the regions which are remote from a heating element. This means that the heating process required for the connection of the two foils will have different effects including the effect of different degrees of expansion at different locations of the steel of the pressing stamp and such that in the stamping surface a height profile will develop which will prevent a uniform application of pressure to the foil so that the projecting stamp regions will apply a higher pressure to a film than the set back stamp regions. In regions of comparatively lower pressure, there is a poorer welding of the two films. Graphically a film will have a thickness of 20μ and tolerance deviations caused by the pressure stamp can correspond also to about 20μ and thus give rise to significant collective defects. The steel of the pressing stamp may have typically a temperature of about 150° to about 250° C.

The object of the invention is, therefore, to provide a pressing stamp device which will have a homogeneous internal temperature distribution to thereby minimize the development of height profiles at the pressing surface.

For a device of the type described at the outset, this object is achieved in that the stamping element is constructed with a multilayer configuration and comprises substantially three layers, whereby a heated central layer of a first material with a high thermal conductivity value is flanked by two peripheral layers of a second material and the face of one of the peripheral layers forms the stamping surface.

Preferred embodiments or features of the invention are the subject of the dependent claims.

With the device according to the invention, through the combination of features that the stamping element is configured to be multilayered and includes substantially three layers, whereby a heated central layer of a first material with a high thermal conductivity value is surrounded or embraced by two peripheral layers of a second material and a face of one of the peripheral layers forms the stamping surface, a device is obtained in which because of the higher thermal conductivity of the material of the central layer in combination with the symmetrical sandwich construction of the stamping element, internal stresses are avoided which might otherwise arise from different temperature expansion coefficients of the materials of the central layer and the peripheral layers and cause a lateral bending of the stamping element as was the case with a thermally asymmetrical and, for example, two layer construction of the bimetallic strip type in the past.

In a configuration of the central layer of copper, the thermal conductivity with respect to the peripheral layers which can be composed of steel, is about 7× higher so that a substantially homogeneous temperature distribution can be achieved in the central layer which functions as a heating element for the two steel layers above and below it in the sandwich construction and from the peripheral layers.

Quintessentially, therefore, with the configuration according to the invention of the press stamping device, at practically all temperatures the stamping layer will have an unusually planar conformation which will insure that in the heating up process there will be parallel expansion between the different material layers longitudinally exclusively at the interfaces between the layers of different materials precluding a lateral curvature of the type which can arise in a bimetallic strip. The device according to the invention is thus configured with thermal symmetry. The peripheral layers are thus constructed to fulfill the requirements of material hardness which may be necessary for the stamping process.

According to a first preferred embodiment of the device of the invention, the two peripheral layers will have identical thicknesses. In this manner, a thermal symmetry can be achieved in a very simple mechanical manner. The thermal heating required for a bonding or welding process between two firms can be achieved advantageously through heating elements which are provided in bores of the central layer. The heating elements are thus advantageously formed by electrically heatable heating wires.

The central layer can, for example, be made from copper or aluminum and has typically a thickness of about 20 mm. The peripheral layers can, for example, if being made from steel and can typically have a thickness of about 10 mm to 15 mm.

The stamping element is preferably of rectangular configuration. Alternatively the stamping element can have a circular configuration. Advantageously the stamping element can be of a square configuration. Advantageously the stamping element can be of a square configuration and then typically will have an edge length of about 300 mm.

According to a further preferred embodiment of the device of the invention it is provided that in an off-center region the peripheral layer of the stamping element is configured with an elongated hole and in the region of this elongated hole, the central layer is configured with a bore in which a further pin is fitted and which is slidable in the elongated hole. Thereby a retention of the various layers together while a preclusion of a lateral shift of the different layers can be achieved.

According to a further important preferred embodiment, the device of the invention is so provided that in an off-center region of the stamping element an elongated hole which traverses all of the layers is provided and in that hole a further pin is fitted. In that manner a rotation of the various layers is prevented even under thermal conditions which might cause such rotation because of different magnitudes of the thermal expansion of the layers. The peripheral layers of the device according to the invention are preferably secured together through screws through the central layer.

Figure 2:
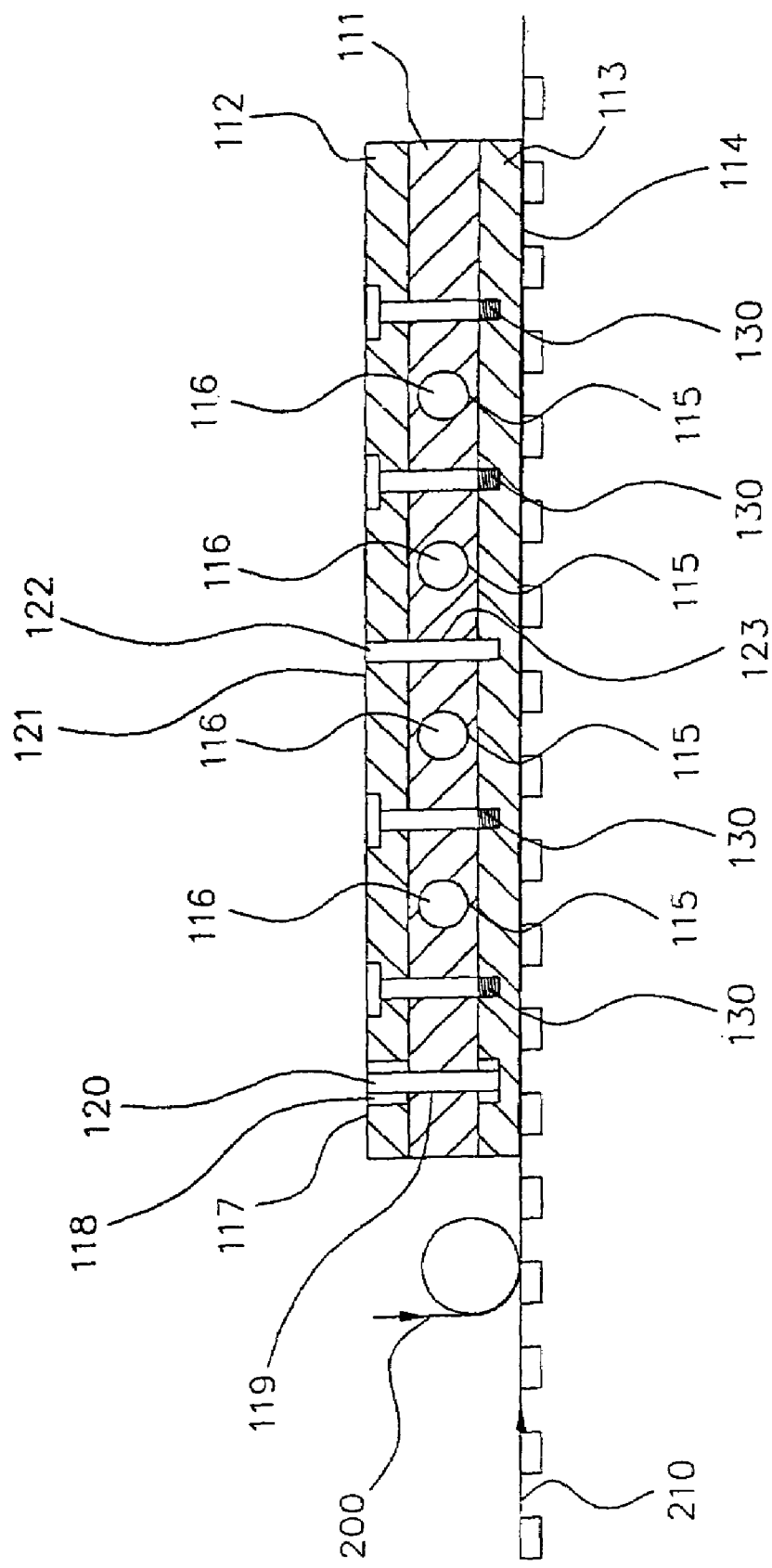

The device according to the invention is described below in connection with a preferred embodiment which is illustrated in the Figures of the drawing. These show:

FIG. 1 a first preferred embodiment of the device according to the invention in a perspective view from above;

FIG. 2 the preferred embodiment illustrated in FIG. 1 of the device according to the invention in a cross sectional view.

The pressure stamp device 100 according to the invention shown in FIGS. 1 and 2 for the sealing of foils comprises a heatable stamping element 110 with a stamping surface 114 for applying a pressure to a first foil 200 in order to bond this film or foil to a second foil or film 210 supported beneath the first, whereby according to the significant aspect of the invention the stamping element 110 has three layers 111, 112, 113, whereby a heated central layer 111 of a first material with a high thermal conductivity value is flanked by two peripheral layers 112,113 of a second material and the surface 114 is formed by one of the peripheral layers 112, 113. In the central layer 111 bores 115 are formed through which the electrically heatable heating wires 116 are guided as heating elements.

The stamping element 110 has a square configuration and has an edge length of about 300 mm, whereby the two peripheral layers 112, 113 are of identical thickness. The central layer 111 is made from copper and has a thickness of about 20 mm. The peripheral layers 112, 113 are each made of steel and have a thickness of about 12 mm.

In an off-center region 117, the peripheral layers 112, 113 of the stamping element 110 have a longitudinal hole [slot] 118 whereby in the region of the slot 118 in the central layer 111, a bore 119 if formed in which a further pin 120 is fitted and which is slidable in the slot 118. In addition in a central region 121 of the stamping element 110, a bore 123 extends through all layers and in that bore a further pin 122 is fitted.

The peripheral layers-112, 113 are-secured fixedly together by screws 130 traversing the central layer 111.

The above-described embodiment of the invention serves only for the purpose of a better understanding of the teachings according to the invention defined by the claims which, as such, are not limited by the embodiment.

The invention claimed is:

1. A pressure stamp device for sealing of films with a heatable stamping element having a stamping surface for applying a pressure to a first film in order to bond it with a supported second film, characterized in that the stamping element has a multilayer configuration and comprises three layers including a heated central layer of a first material with a high thermal conductivity value flanked by two peripheral layers of steel, one of which forms the stamping surface.

2. The device according to claim 1 characterized in that the two peripheral layers are of identical thickness.

3. The device according claim 1 characterized in that the central layer is made of copper.

4. The device according to claim 1 characterized in that the central layer is made of aluminum.

5. The device according to claim 1 characterized in that the central layer has a thickness of about 20 mm.

6. The device according to claim 1 characterized in that the steel layers have a thickness of about 10 mm to 15 mm.

7. The device according claim 1 characterized in that bores are provided in the central layer through which heating elements are passed.

8. The device according to claim 7 characterized in that the heating elements are electrically heatable heating wires.

9. The device according to claim 1 wherein the stamping element is rectangular.

10. The device according to claim 1 characterized in that the stamping element is circular.

11. The device according to claim 1 characterized in that the stamping element is square with an edge length of about 300 mm.

12. A pressure stamp device for sealing of films with a heatable stamping element having a stamping surface for applying a pressure to a first film in order to bond it with a supported second film, characterized in that the stamping element has a multilayer configuration and comprises three layers including a heated central layer of a first material with a high thermal conductivity value flanked by two peripheral layers of a second material, one of which forms the stamping surface, and wherein in a central region the stamping element is traversed by a hollow cylindrical bore through all layers in which a cylindrical pin is fitted.

13. A pressure stamp device for sealing of films with a heatable stamping element having a stamping surface for applying a pressure to a first film in order to bond it with a supported second film, characterized in that the stamping element has a multilayer configuration and comprises three layers including a heated central layer of a first material with a high thermal conductivity value flanked by two Peripheral layers of a second material, one of which forms the stamping surface, and wherein in an off-center region the peripheral layers of the stamping element have a slot and in the region of the slot in the central layer a bore is provided in which a further pin is fitted which is slidable in the slot.

14. A pressure stamp device for sealing of films with a heatable stamping element having a stamping surface for applying a pressure to a first film in order to bond it with a supported second film, characterized in that the stamping element has a multilayer configuration and comprises three avers including a heated central layer of a first material with a high thermal conductivity value flanked by two peripheral layers of a second material, one of which forms the stamping surface, and wherein the peripheral layers are secured together by screws traversing the central layer.

* * * * *